US012629691B1

(12) United States Patent
Korankyi

(10) Patent No.: US 12,629,691 B1
(45) Date of Patent: May 19, 2026

(54) SCRAPING DEVICE FOR REMOVING SUBSTANCES FROM THE INTERIOR SURFACE OF CONTAINERS

(71) Applicant: Dare LLC, Jamestown, NC (US)

(72) Inventor: Ivana Korankyi, Jamestown, NC (US)

(73) Assignee: Dare LLC, Jamestown, NC (US)

( * ) Notice: Subject to any disclaimer, the term of this patent is extended or adjusted under 35 U.S.C. 154(b) by 512 days.

(21) Appl. No.: 17/967,438

(22) Filed: Oct. 17, 2022

Related U.S. Application Data

(60) Provisional application No. 63/257,524, filed on Oct. 19, 2021.

(51) Int. Cl.
*B08B 9/087* (2006.01)
*A46B 1/00* (2006.01)
*A46B 5/00* (2006.01)
*A46B 5/02* (2006.01)
*A46B 9/02* (2006.01)

(52) U.S. Cl.
CPC ................ *B01L 13/02* (2019.08); *A46B 1/00* (2013.01); *A46B 5/0016* (2013.01); *A46B 5/02* (2013.01); *A46B 9/026* (2013.01); *B08B 9/087* (2013.01); *A46B 2200/3006* (2013.01); *B08B 2209/08* (2013.01)

(58) Field of Classification Search
CPC ......... B01L 13/02; A46B 1/00; A46B 5/0016; A46B 5/02; A46B 9/026; A46B 2200/3006; A46B 15/0081; A46B 17/08; A46B 2200/3013; B08B 9/38; B08B 9/087; B08B 9/0808; B08B 1/16; B08B 1/165; B23D 79/08; B44D 3/16; B44D 3/162; B44D 3/164; E01H 5/02
See application file for complete search history.

(56) References Cited

U.S. PATENT DOCUMENTS

| | | | | |
|---|---|---|---|---|
| 4,197,018 | A | 4/1980 | Groen, Jr. | |
| 6,611,983 | B1 * | 9/2003 | Hopey | B08B 1/00 15/104.03 |
| 7,182,377 | B2 | 2/2007 | Grundler | |
| 7,284,293 | B1 * | 10/2007 | Holder | B08B 1/12 15/210.1 |
| 8,709,362 | B2 | 4/2014 | Leventhal et al. | |
| 9,592,537 | B2 | 3/2017 | Bruney | |
| 10,654,080 | B2 | 5/2020 | Soni | |
| 2004/0159331 | A1 * | 8/2004 | Katsin | B08B 1/00 15/210.1 |
| 2005/0178403 | A1 * | 8/2005 | Amos | B08B 1/165 15/236.08 |
| 2006/0103150 | A1 | 5/2006 | Leonard | |
| 2006/0260079 | A1 | 11/2006 | Horton | |
| 2013/0306107 | A1 * | 11/2013 | Jensen | A47L 11/4094 15/246.2 |

(Continued)

*Primary Examiner* — Andrew A Horton
(74) *Attorney, Agent, or Firm* — Neo IP

(57) ABSTRACT

A scraping device for removing dry substances that have adhered to the interior surface laboratory vessel. The scraping device comprising a handle, a curved hook, a ribbed edge, an elbow joint, and a scraping tip. The hook part of the scraping device conforms to the curvature of the interior surface of a round laboratory vessel such as a volumetric flask, Florence flask, and round bottom flasks. The elbow joint of the scraping device enables hook portion to pass through the long narrow neck found in most laboratory vessels.

14 Claims, 9 Drawing Sheets

(56) References Cited

U.S. PATENT DOCUMENTS

| | | | | |
|---|---|---|---|---|
| 2015/0174624 | A1 | 6/2015 | Cunningham | |
| 2016/0008858 | A1 * | 1/2016 | Runstad | A47L 17/00 15/244.4 |
| 2017/0189946 | A1 | 7/2017 | Beardsley | |
| 2019/0375035 | A1 * | 12/2019 | Chavez, Jr. | B23D 79/08 |
| 2020/0093324 | A1 * | 3/2020 | Krantz | B08B 9/087 |

* cited by examiner

SCRAPING DEVICE FOR REMOVING SUBSTANCES FROM THE INTERIOR SURFACE OF CONTAINERS

CROSS-REFERENCES TO RELATED APPLICATIONS

This application is related to and claims priority from the following U.S. patents and patent applications. This application claims priority to and the benefit of U.S. Application No. 63/257,524, filed on Oct. 19, 2021, which is incorporated herein by reference in its entirety.

BACKGROUND OF THE INVENTION

1. Field of the Invention

The present invention relates to scraping devices, and more specifically to scraping devices designed to remove substances that have adhered to or have been deposited on the inside surface of a laboratory vessel.

2. Description of the Prior Art

It is generally known in the prior art to provide devices for cleaning the inside surface of a container with a wide opening.

Prior art patent documents include the following:

US Patent Publication No. 2020/0093324 for Brush for flat bottom semi-globe shaped coffee pots by inventor Krantz, filed Apr. 6, 2019 and published Mar. 26, 2020, is directed to a brush and method for cleaning coffee decanters. The invention makes this necessary task through, simple, and efficient. The invention facilitates the cleaning of both straight sided insulated and semi-globe coffee decanters.

US Patent Publication No. 2017/0189946 for Scraping tool by inventor Beardsley, filed Dec. 30, 2016 and published Jul. 6, 2017, is directed to a scraping tool having a handle, an arcuately-shaped blade configured to fit a curved surface of the inside of a container, a neck configured to couple the handle to the blade, and a lip extending outward from the front surface at an angle.

US Patent Publication No. 2015/0174624 for Apparatus and method for cleaning a rounded tank by inventor Cunningham, filed Dec. 19, 2013 and published Jun. 25, 2015, is directed to an apparatus for cleaning a rounded tank such as the tank of a gasoline tanker has a pivoting coupler between its handle and the base its cleaning head. In this embodiment the base of the head is formed with lugs which receive a tongue. The tongue is formed on an end of the pivoting coupler. A pin traverses corresponding holes in the lugs and pivoting coupler in order to allow the pivoting coupler to pivot relative to the head. Further embodiments include a water supply tank mounted to the handle and a pump arranged to urge water from the tank through a conduit out through the head of the cleaning apparatus.

US Patent Publication No. 2006/0260079 for Expandable cleaning brush by inventor Horton, filed May 19, 2005 and published Nov. 23, 2006, is directed to a cleaning and scouring brush generally made from a pair of twisted wire arms, each arm having a cleaning portion shaped to conform to the interior profile of an article to be cleaned. The portions including a cleaning or scouring device such as a sponge, scrubber or bristles intended to clean or scour the interior surface of the article to be cleaned. A handle which rotates the cleaning portions with respect to one another about an axis in order to facilitate the entry and removal of the device from the article to be cleaned which generally has a relatively small opening into a relatively large interior volume.

US Patent Publication No. 2006/0103150 for Bottle contaminant remover by inventor Leonard, filed Nov. 12, 2004 and published May 18, 2006, is directed to a bottle contaminant remover comprising a curved shank, an extension member and a hook member. The extension member extends from one end of the curved shank at an obtuse angle. A hook member extends from the extension member at an acute angle. The distance between the extension member—hook member junction and the end of the hook member is less than the diameter of the bottle opening of the bottle containing the contaminant. The shank, the extension member and the hook member form a cup like structure for grasping the bottle contaminant. A handle is attached to the shank to permit a user to hold the device and to apply finger pressure to the shank. To use the device it is inserted into a bottle. The contaminant is grasped. The device and the contaminant are then removed from the bottle.

U.S. Pat. No. 9,592,537 for Residue removal device for narrow necked vessels by inventor Bruney, filed Jul. 8, 2015 and issued Mar. 14, 2017, is directed to a residue removal device for extracting leftover material from a narrow-necked vessel. The residue removal device may include a receptacle adapted for collecting material from sides and bottom of a vessel. The receptacle may include a material collecting channel formed by two side walls connected along a base at an angle, an open top, a distal end, and a proximal end. The residue removal device may further include an elongated shaft having a proximal end and a distal end, and the distal end of the shaft may be connected to the base of the receptacle and offset in a first direction from the proximal end of the shaft. The open top may also be offset from the base of the receptacle in the first direction.

U.S. Pat. No. 8,709,362 for Laboratory spatula by inventors Leventhal, et al., filed Jun. 1, 2012 and issued Apr. 29, 2014, is directed to laboratory spatula having stalk regions with a hollow first end and a hollow second end and at manipulating regions may be used for collecting, transporting or storing a material. A manipulating region may be configured as a shovel region, a scoop region, a whisk region, a punch region, a sieve region, a loop region, a cutting edge, a spreading region, a grinding region, a hook region, a scraper region, a tweezer region, a grasper region, or a pick region. The spatula may be lightweight and disposable, and may be any appropriate size including micro size, a regular size, or a macro size. The spatula may also have an anti-stick surface. The spatula may be calibrated, and may include calibration marks or additional features.

U.S. Pat. No. 7,182,377 for Kitchen spatula with offset handle by inventor Grundler, filed Feb. 24, 2003 and issued Feb. 27, 2007, is directed to an improved spatula that has a handle shaped to permit easy removal of the contents of condiment containers. The spatula handle possesses a double angled offset such that when held in the hand, the spatula head makes flush contact with the walls of a condiment container.

U.S. Pat. No. 4,197,018 for Mixer by inventor Groen, filed Jan. 8, 1979 and issued Apr. 8, 1980, is directed to a mixer comprising a shaft which is appropriately curved to substantially conform to the interior shape of the sides and bottom walls of a steam kettle and a structure for supporting the shaft within the steam kettle. The latter consists of a lid which fits about the peripheral upper edge of the steam kettle. A length of a heat resistant, self lubricating, tubular material, such as Teflon, is slidably extended over substantially the entire length of the shaft, to perform a dual function. This material, first of all, eliminates the need for any type of bearing structure which normally would be required in order for the shaft to be rotated when disposed to extend through the lid, into the steam kettle. The material itself functions as a bearing. Secondly, the material being heat resistant can seat on the bottom of the steam kettle and thereby permit the shaft to be easily and properly seated in the steam kettle without the need for other mechanical devices. This material also functions to wipe or scrape the product from the walls of the steam kettle, while preventing the shaft from directly contacting the metal surfaces of the steam kettle, so that the product is constantly or continuously wiped from the walls of the steam kettle and there is no metal-to-metal contact between the shaft and the steam kettle during stirring or mixing. A stirring blade is attached to the shaft in a fashion such that it is easily removed for cleaning. The shaft is easily rotated by a handle affixed to its upper terminal end.

U.S. Pat. No. 10,654,080 for Device and method for material removal by inventor Soni, filed Nov. 6, 2015 and issued May 19, 2020, is directed to a device is provided for removing material from a container. The device including a scoop and a connector. The scoop extends distally from a shoulder portion. The connector extends proximally from the shoulder portion and couples the device to a tube within the container.

SUMMARY OF THE INVENTION

The present invention relates to scraping devices, and more specifically to scraping devices designed to remove samples that have adhered to the inside surface of a laboratory vessel.

It is an object of this invention to provide a scraping device providing utilities such as the ability to scrape and remove samples that have adhered to the inside surface of laboratory vessel with a narrow opening such as, but not limited to, volumetric flasks, round bottom flasks, and Florence flasks.

In one embodiment, the present invention provides a scraping device for scraping and removing substances from an interior surface of a vessel including a handle, an elbow joint, a hook including a ribbed edge, and a scraping tip, wherein the handle is connected to the hook by the elbow joint, wherein the hook is operable to bend and conform to the interior surface of the vessel, wherein the ribbed edge of the hook is used as a point of contact between the scraping device and the interior surface of the vessel, wherein the ribbed edge is operable to scrape substances that have adhered to or have been deposited on the interior surface of the vessel, wherein the vessel includes an opening and a neck, wherein the hook has a handle end and a distal end, and wherein the scraping tip is connected to the distal end of the hook and extends away from the distal end of the hook.

In another embodiment, the present invention provides a scraping device for scraping and removing substances off an interior surface of a laboratory vessel including, a handle, an elbow joint, a hook, a ribbed edge, and a scraping tip, wherein the handle is connected to the hook by the elbow joint, wherein the hook is operable to bend and conform to the interior surface of the laboratory vessel, wherein the ribbed edge is used as a point of contact between the scraping device and the interior surface of the laboratory vessel, wherein the ribbed edge is operable to scrape substances that have adhered to the interior surface of the laboratory vessel, wherein the laboratory vessel includes a small opening and a long neck, wherein the hook has a handle end and a distal end; and wherein the scraping tip is connected to the distal end of the hook and extends away from the distal end of the hook.

In yet another embodiment, the present invention provides a scraping device for scraping and removing substances off an interior surface of a laboratory vessel including, a handle, finger grips, a elbow joint, a hook, a ribbed edge; and a scraping tip, wherein the handle is connected to the hook by the elbow joint, wherein the finger grips are indents within the handle, wherein the hook is operable to bend and conform to the interior surface of the laboratory vessel, wherein the ribbed edge is used as a point of contact between the scraping device and the interior surface of the laboratory vessel, wherein the ribbed edge is operable to scrape substances that have adhered to the interior surface of the laboratory vessel, wherein the laboratory vessel includes a small opening and a long neck, wherein the hook has a handle end and a distal end, and wherein the scraping tip is connected to the distal end of the hook and extends away from the distal end of the hook.

These and other aspects of the present invention will become apparent to those skilled in the art after a reading of the following description of the preferred embodiment when considered with the drawings, as they support the claimed invention.

DETAILED DESCRIPTION

Figure 1:
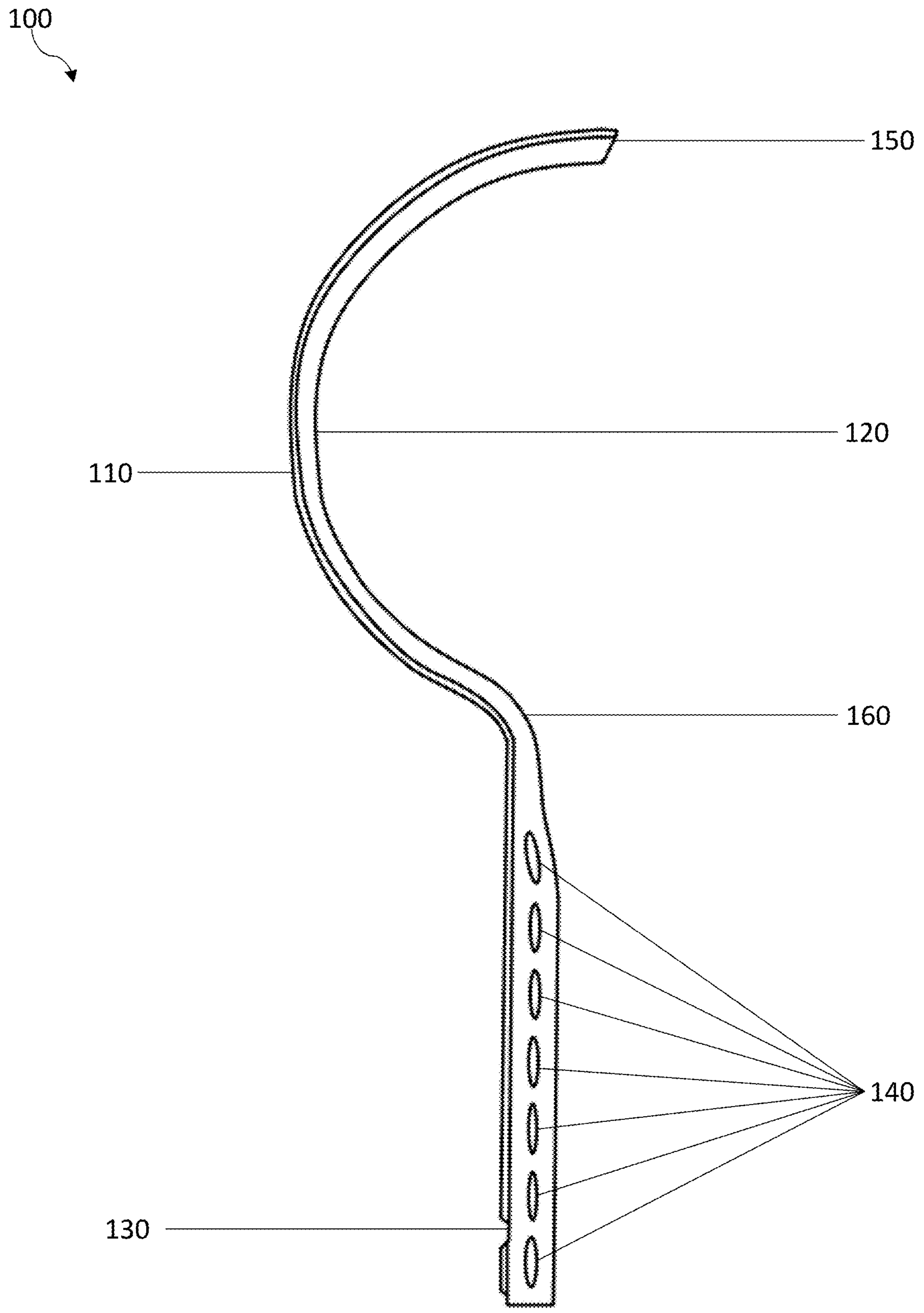
FIG. 1 illustrates a side orthogonal view of a scraping device according to one embodiment of the invention.

The present invention is generally directed to scraping substances off the interior surface of laboratory vessel.

In one embodiment, the present invention provides a scraping device for scraping and removing substances off an interior surface of a vessel including a handle, an elbow joint, a hook a ribbed edge, and a scraping tip, wherein the handle is connected to the hook by the elbow joint, wherein the hook is operable to bend and conform to the interior surface of the vessel, wherein the ribbed edge is used as a point of contact between the scraping device and the interior surface of the vessel, wherein the ribbed edge is operable to scrape substances that have adhered to the interior surface of the vessel, wherein the vessel includes an opening and a neck, wherein the hook has a handle end and a distal end, and wherein the scraping tip is connected to the distal end of the hook and extends away from the distal end of the hook.

In another embodiment, the present invention provides a scraping device for scraping and removing substances off an interior surface of a laboratory vessel including, a handle, a elbow joint, a hook, a ribbed edge, and a scraping tip, wherein the handle is connected to the hook by the elbow joint, wherein the hook is operable to bend and conform to the interior surface of the laboratory vessel, wherein the ribbed edge is used as a point of contact between the scraping device and the interior surface of the laboratory vessel, wherein the ribbed edge is operable to scrape substances that have adhered to the interior surface of the laboratory vessel, wherein the laboratory vessel includes a small opening and a long neck, wherein the hook has a handle end and a distal end; and wherein the scraping tip is connected to the distal end of the hook and extends away from the distal end of the hook.

In yet another embodiment, the present invention provides a scraping device for scraping and removing substances off an interior surface of a laboratory vessel including, a handle, finger grips, an elbow joint, a hook, a ribbed edge; and a scraping tip, wherein the handle is connected to the hook by the elbow joint, wherein the finger grips are indents within the handle, wherein the hook is operable to bend and conform to the interior surface of the laboratory vessel, wherein the ribbed edge is used as a point of contact between the scraping device and the interior surface of the laboratory vessel, wherein the ribbed edge is operable to scrape substances that have adhered to the interior surface of the laboratory vessel, wherein the laboratory vessel includes a small opening and a long neck, wherein the hook has a handle end and a distal end, and wherein the scraping tip is connected to the distal end of the hook and extends away from the distal end of the hook.

None of the prior art discloses a scraping device with a hook shape allowing for the tool to access a laboratory vessel through a narrow opening and neck, and conform to the inside surface of a laboratory vessel to scrape substances that have adhered to the inside surface of the laboratory vessel.

Most laboratory vessels, such as Florentine flasks, round-bottom flasks, and volumetric flasks, used in laboratory experiments and processes are designed with narrow openings and long necks to prevent substances from unintentionally escaping the vessel. The narrow opening and long necks of these vessels make it difficult to remove substances, such as oils and powders, that have adhered to the inside surfaces of the vessels. This is especially difficult after a vessel has been used for rotary evaporation. Rotary evaporation is the process of reducing the volume of a solvent within a vessel by distributing it as a thin film across the inside surface of a vessel at an elevated temperature and reduced pressure. During rotary evaporation, a vessel is rotated at approximately 250 to 280 revolutions per minute to create a centrifugal force. The combination of the centrifugal forces, high temperatures, and decreased pressured to reduce the volume of a solvent within a vessel causes the remaining sample within the vessel to adhere to the inside surfaces of the vessel. Prior art tools used to remove substances from the inside surface of a vessel do not include the necessary geometry to reach and conform to the inside round surface of a vessel by entering through the narrow opening and long neck of a laboratory vessel. In addition, none of the prior art tools used to remove substances from the inside surface of a vessel include the ribbed edge necessary to scrape dry or wet substances that have adhered to the inside surface of a vessel.

Tools currently used to remove samples from the inside surfaces of a vessel are not designed specifically for laboratory vessels. The unique long necks and narrow openings of laboratory vessels differentiate them from other glass vessels such as coffee pots, condiment jars, and food containers. Current tools used to scrape the inside surface of a vessel are not capable of entering or fitting inside of a laboratory vessel such as a volumetric flask, round bottom flask, and/or Florence flask. Even if current tools were capable of entering and fitting within a laboratory glass vessel, current tools are not operable to conform to the inside surface of a vessel to create a larger surface contact area between the tool and round surface of the vessel. U.S Patent Publication No. 2020/0093324 and US Patent Publication No. 2006/0260079 disclose cleaning brushes with a hook shape for cleaning the inside of a coffee pot, but because of the unique geometry of laboratory vessels, the disclosed cleaning brushes cannot be adopted or manipulated to fit within a laboratory vessel. Coffee pots have a much larger opening at the top and do not have a narrow neck, making the inside surface of coffee pots easier to clean and scrape compared to a laboratory vessel.

Unlike coffee pots, laboratory vessels have small openings at the top of the vessel and long narrow necks. Therefore, there exists a need to provide a tool that is operable to be manipulated to pass through the small opening and long narrow neck of laboratory vessels while maintaining the structure and geometry necessary to scrape and remove substances that have adhered to the round interior surface of a vessel.

The present invention provides a device for scraping the entire interior surface of a laboratory vessel with a round body, small opening, and long neck. While the present invention is designed for laboratory vessels, one of ordinary skill in the art will easily recognize that the present invention is not limited to laboratory vessels and that the present invention is operable to be utilized for any vessel with a curved interior surface.

In the scope of the present disclosure, the term laboratory vessel is not meant to limit the scope of invention to flasks such as volumetric flasks, round bottom flasks, and Florence flasks, but instead, include any vessel where the width of the body of the vessel is wider than the opening and/or neck of the vessel. It would be obvious to a person of ordinary skill in the art that the present invention possesses certain advantages over prior art scraping tools, making the scraping device useful in any application where a substance is desired to be removed from an interior surface of a vessel.

Referring now to the drawings in general, the illustrations are for the purpose of describing one or more preferred embodiments of the invention and are not intended to limit the invention thereto.

Figure 2:
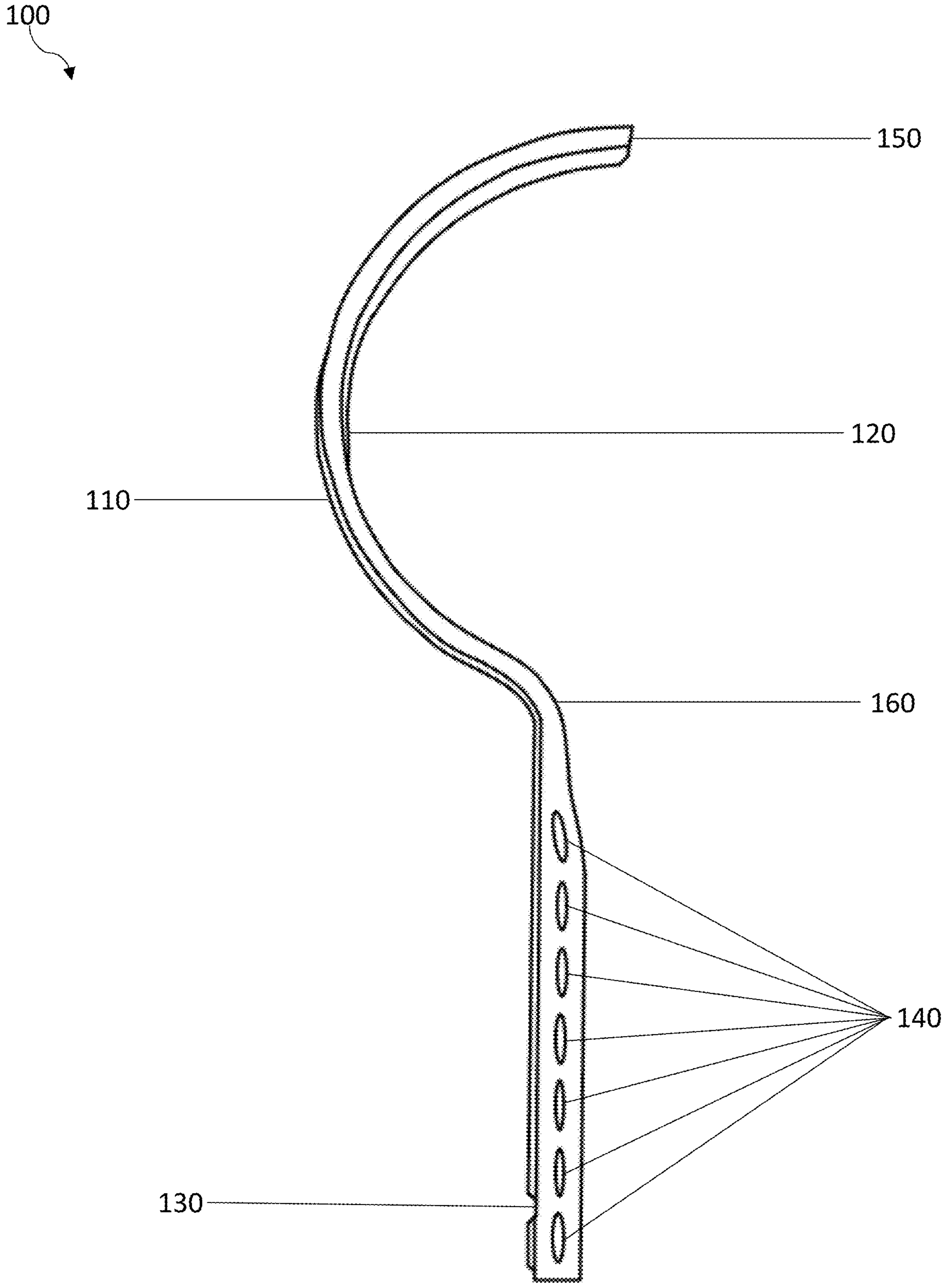
FIG. 2 illustrates a side perspective view of a scraping device according to one embodiment of the invention.

FIGS. 1-6 illustrate multiple views of one embodiment of a scraping device of the present invention. As illustrated in FIG. 1 and FIG. 2, the scraping device 100 includes a handle 130, finger grips 140, an elbow joint 160, a hook 120, a ribbed edge 110 and a scraping tip 150. The handle 130 with the finger grips 140 is connected to the hook 120 via the elbow joint 160, with the other end of the hook 120 including a scraping tip 150. The ribbed edge 110 is formed along at least a portion of the outer surface of the hook 120. In one embodiment, the scraping device 100 is integrally formed of a polymer material such as polylactic acid (PLA). The scraping device 100 is operable to be constructed using any technique known in the art, including but not limited to injection molding and 3D printing. Alternatively, the scraping device 100 is integrally formed of metal, such as stainless steel. In another embodiment, the handle 130 of the scraping device 100 is removably attached to an integrally formed elbow joint 160 and hook 120. In embodiments where the handle 130 is removably attached to the integrally formed elbow joint 160 and hook 120, different size hooks are operable to be attached to the handle for scraping the interior of different size flasks. This enables the handle 130 to be reused and each hook 120 to be disposed of after use to prevent contamination among scraped substances from different flasks which would otherwise occur if the hook 120 were reused and not properly cleaned. The handle 130 and integrally formed elbow joint 160 and hook 120 are operable to be attached and removed from each other via any mechanism known in the art. In one example, the handle 130 includes a female threaded portion at the end of the handle and the elbow joint 160 includes a male threaded portion which is operable to be attached to the female threaded portion via rotation. Alternatively, the elbow joint 160 and corresponding hook 120 and the handle 130 include male and female portions operable to provide for removable attachment of the elbow joint 160 with the handle 130. In another embodiment, the handle 130 includes two rounded protrusions at the end of the handle 130 operable to frictionally engage with two holes on a hollow end portion of the elbow joint 160 such that the hook 120 and corresponding elbow joint 160 are operable to be removably attached to the handle 130. In one embodiment, the rounded protrusions are push-button protrusions which are operable to be depressed partially or fully into the handle 130 to allow for the handle 130 to be inserted into the hollow portion of the elbow joint 160 so that the hook 120 is removably attached to the handle 130.

Figure 3A:
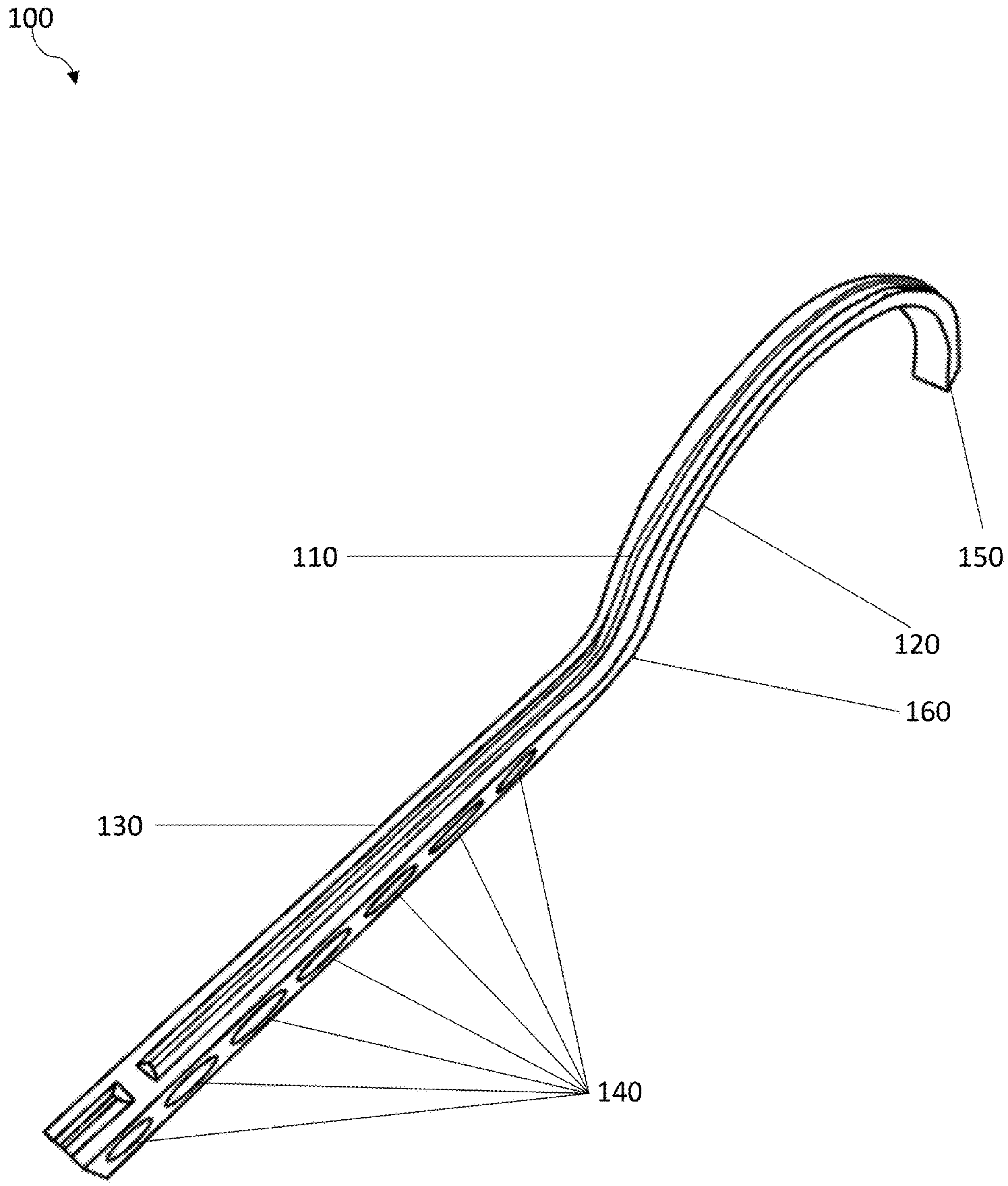
FIG. 3A illustrates a top perspective view of a scraping device according to one embodiment of the invention.

FIG. 3A illustrates a top perspective view of a scraping device 120 including a handle 130, finger grips 140, an elbow joint 160, a hook 120, a ribbed edge 110, and a scraping tip 150.

Figure 4:
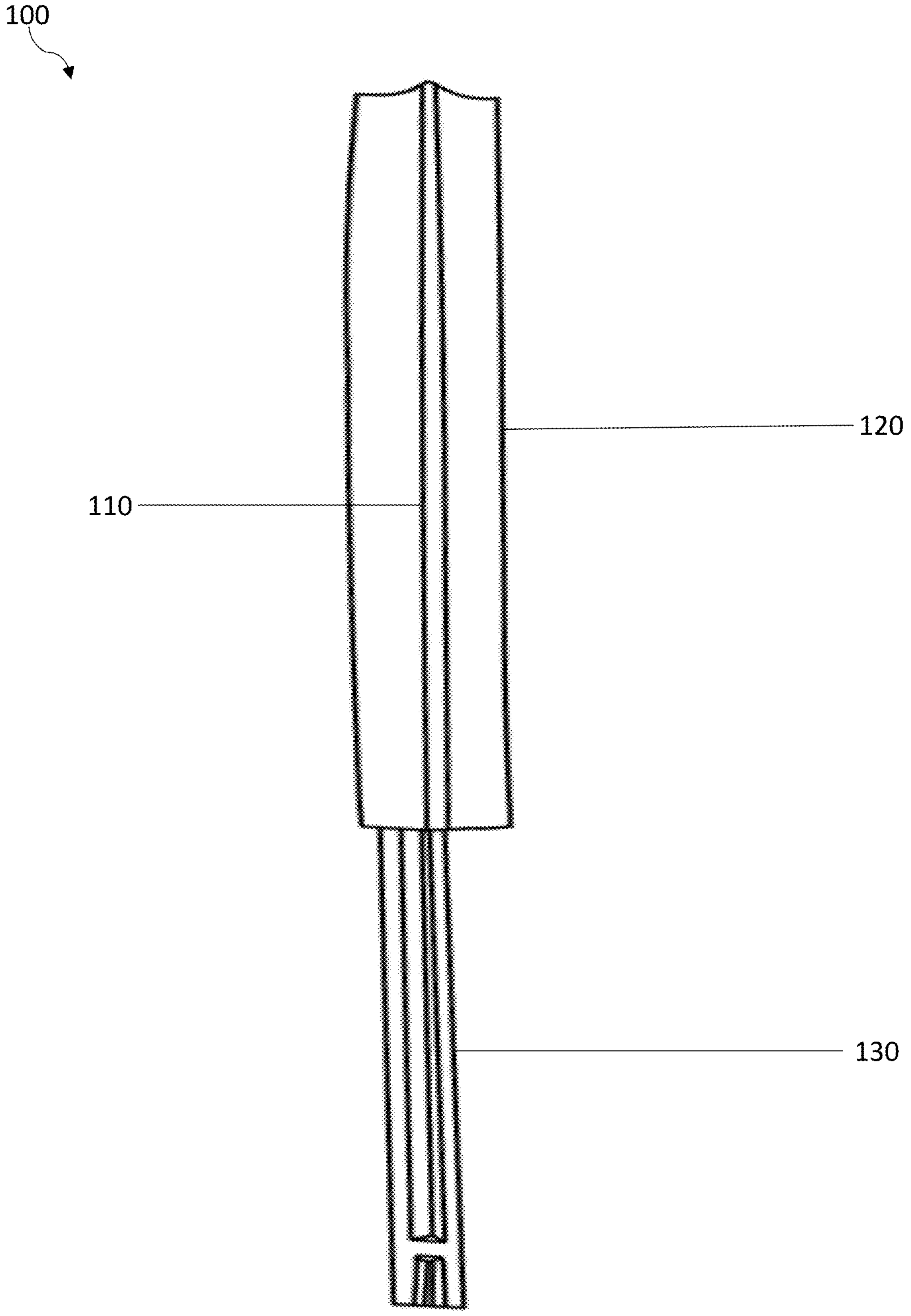
FIG. 4 illustrates a top orthogonal view of a scraping device according to one embodiment of the invention.

FIG. 4 illustrates a top orthogonal view of a scraping device 120. The scraping device 100 includes a handle 130, a hook 120, and a ribbed edge 110.

In one embodiment, the ribbed edge 110 runs along the outside perimeter of the scraping device 100 in its entirety and acts as a scraping edge to scrape an interior of a container. In one embodiment, the ribbed edge 110 begins at the beginning of the handle of the scraping device 100 and extends to the end of the scraping tip 150 of the scraping device. In another embodiment, the ribbed edge 110 begins at the elbow joint 160 and extends along the hook 120 to the end of the scraping tip 150. In one embodiment, the ribbed edge 150 is made from a plastic composite such as, but limited to, PLA. In another embodiment, the ribbed edge 150 is made from a metal such as, but not limited to, stainless steel. In yet another embodiment, the ribbed edge 150 is made from a polymer such as, but not limited to, polyurethane. In yet another embodiment, the ribbed edge 150 includes serrations. Serrations on the ribbed edge increase pressure at each point of contact between the ribbed edge and the inside surface of the vessel, making the removal of substances from the inside surface of a vessel easier.

The handle 130 of the scraping device is of sufficient length to extend beyond the neck 210 of a laboratory vessel and provides a sufficient surface to be adequately gripped by a user. In one embodiment, the handle 130 of the scraping device is made from a rubber composite to enable a user to obtain a strong grip on the handle 130. In embodiments where the scraping device 100 is integrally formed, a rubber or polymer handle cover is included over the handle 130 of the integrally formed scraping device 100 to provide increased comfort and gripping ability for a user of the scraping device 100. The rubber or polymer handle cover is operable to be removably attached to the scraping device to provide easy cleaning of the scraping device 100, or is operable to be permanently attached to the scraping device 100. In another embodiment, the handle 130 is made from PLA. In one embodiment, the handle 130 is thicker than the hook 120. Preferably, the increase in thickness of the handle 130 compared to the hook 120 begins at the elbow joint 160 such that the handle 130 tapers down from the distal end of the handle 130 towards the elbow joint 160 of the scraping device. Advantageously, having the handle 130 of the scraping device be thicker than the hook 120 of the scraping device provides for easier gripping of the tool when in use. In another embodiment, the thickness of the handle 130 and the hook 120 of the scraping device 100 is uniform or substantially uniform.

In one embodiment, the handle 130 includes finger grips 140, which are designed as dimples within the handle 130 and are located on both the left and right side of the handle 130. In another embodiment, the finger grips 140 are holes on both the left and right side of the handle 130. Advantageously, the finger grips enable a user to firmly grip the scraping device regardless of whether the user is left hand or right hand dominant. In another embodiment, the scraping devices 100 do not include finger grips 140, and the handle is one solid piece.

Figure 5:
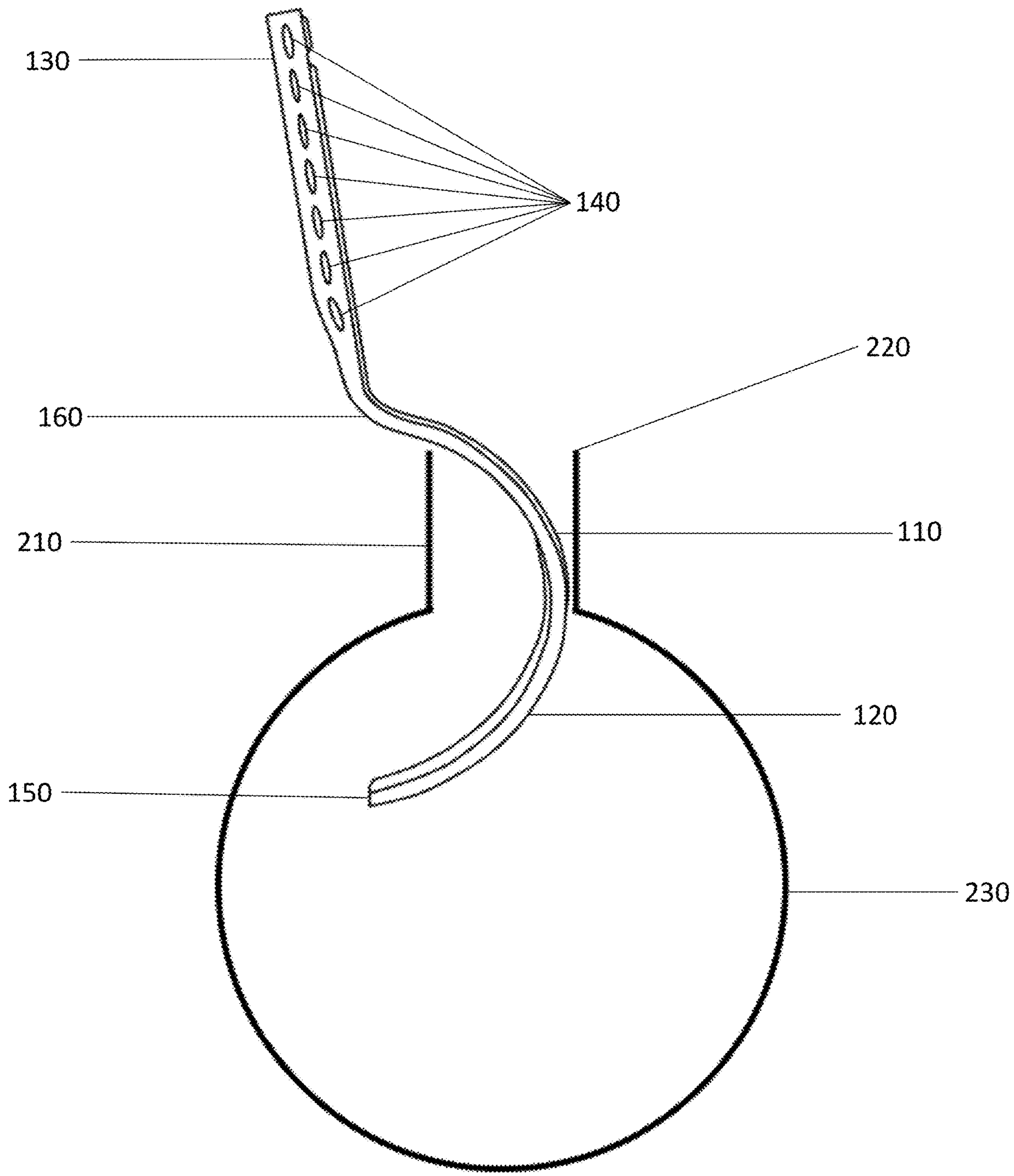
FIG. 5 illustrates a side orthogonal view of a scraping device entering a round bottom flask according to one embodiment of the invention.

The elbow joint 160 is located at approximately the center of the scraping device 100 and connects the handle 130 to the hook 120 of the scraping device 100. In one embodiment, the elbow 160 is made from a rubber composite such that it is operable to slightly deform as necessary but is still rigid enough to withstand the friction forces created by the act of scraping off a substance that has adhered to the inside surface of a vessel. It is important that when the elbow joint 160 is contacting the neck 210 of a laboratory vessel that stress acting on the neck of the vessel is not large enough to damage or crack the vessel. In another embodiment, the elbow joint 160 is made from PLA. In one embodiment, the geometry of the elbow joint 160 and its ability to deflect enables the hook 120 of the scraping device to access the body 230 of a vessel through the opening 220 and neck 210 of a vessel as illustrated in FIG. 5. In another embodiment, the elbow joint is flexible.

Figure 6:
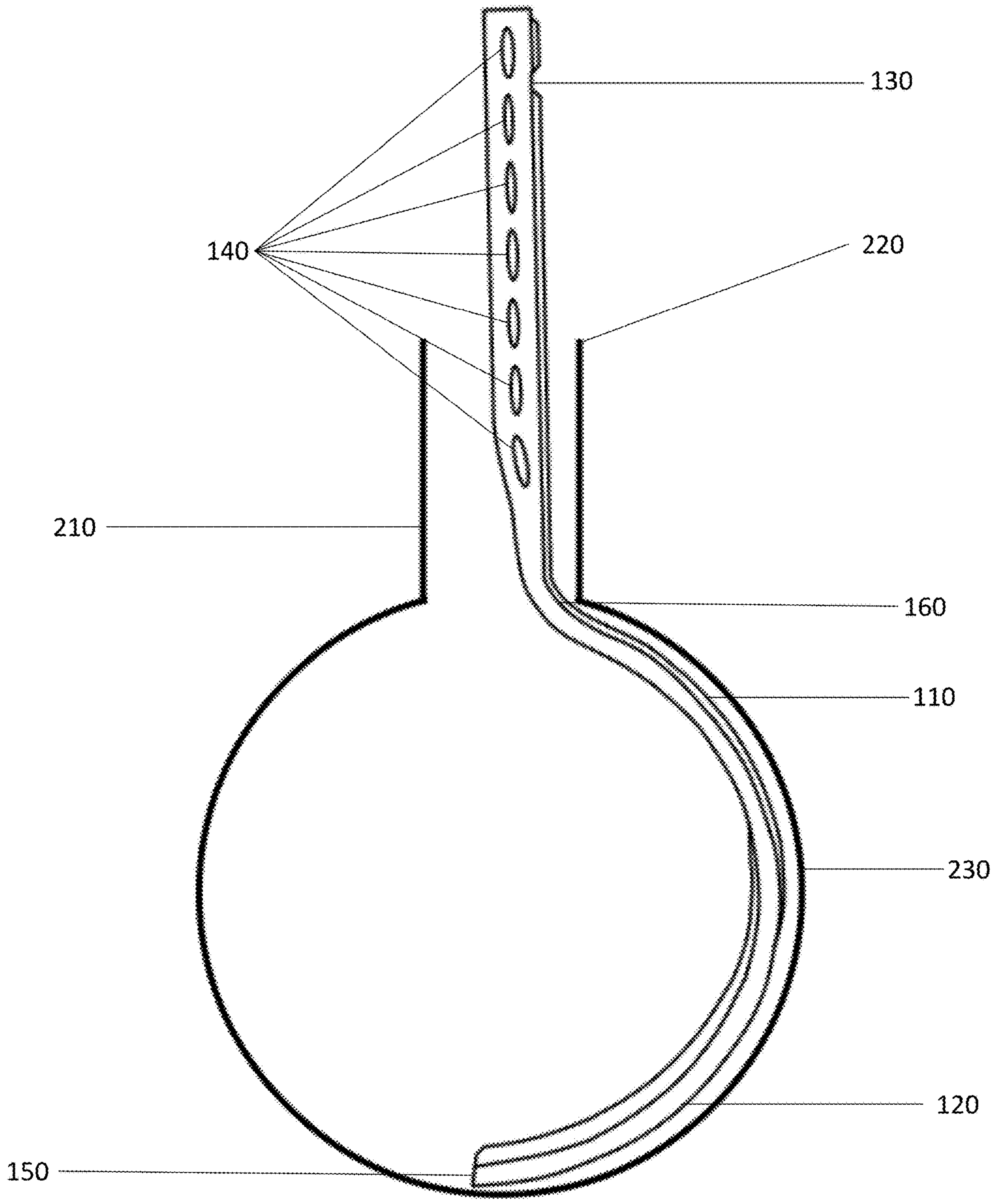
FIG. 6 illustrates a side orthogonal view of a scraping device inside of a round bottom flask according to one embodiment of the invention.

The hook 120 of the scraping device 100 starts at the elbow joint 160 and curves towards a distal end of the scraping device 100 such that the distal end of the scraping device 100 is in the same plane as a plane of the beginning of the hook 120 and the handle 130, and the center of the hook is located at the outer most point along the curvature of the hook 120. Alternatively, the distal end of the scraping device 100 extends beyond a plane including the handle 130 of the scraping device. The hook 120 of the scraping device is operable to conform to the shape and contour of the inside surface of a vessel as illustrated in FIG. 6 to create a larger contact surface area between the scraping device and the inside surface of a vessel. None of the prior art discloses a scraping device that is operable to position the scraping edge to fit flush against the inside surface of a vessel.

The outside perimeter of the hook 120 includes a ribbed edge 110. The ribbed edge is made from a plastic composite or a metal such as, but not limited to, stainless steel. In an alternative embodiment, the ribbed edge includes brush bristles along the entirety of the ribbed edge. Preferably, the brush bristles are made out of steel. The brush bristles include, but are not limited to, stiff bristles, medium bristles, and soft bristles. In another embodiment, the ribbed edge includes chain mail. Preferably, the chain mail is made from, but not limited to, stainless steel. In yet another embodiment, the ribbed edge 150 includes a blade operable to closely contact the interior of the container. The blade configuration advantageously aids in removal of liquids, such as oils, from the interior of the container. The blade is operable to be straight, curved, and/or serrated. Preferably, the blade is made from, but not limited to, a rubber composite or polyurethane. In one embodiment, an attachment including brush bristles, chain mail, and/or a blade is operable to be placed over the ribbed edge 110 and held in place on the ribbed edge via any mechanism for temporary or removable mechanical attachment known in the art, such as one or more snap-fit connectors or clips.

The scraping tip 150 is located at the distal end of the hook 120 of the scraping device and has a slanted end that creates a chisel tip. In one embodiment, the scraping tip 150 is beveled. In one embodiment, the scraping tip 150 includes serrations. Serrations on the scraping tip 150 increase pressure at each point of contact between the scraping tip and the inside surface of a vessel, thereby providing for increased ease of removal of substances from the inside surface of a vessel. Preferably, the scraping tip 150 is made from a plastic composite or a metal such as, but not limited to, stainless steel. In one embodiment, the scraping tip 150 is removably attached to the end of the hook 120, and different scraping tips are operable to be removed and attached from the end of the hook 120. In another embodiment, the scraping tip 150 is made from, but not limited to, PLA. In yet another embodiment, the scraping tip 150 is made from, but not limited to, a rubber composite or polyurethane. The scraping tip 150 is also operable to include a hollow portion on the interior of the scraping tip 150 for collecting a substance that has been scraped from the interior of a vessel. The hollow portion which begins on the interior of the scraping tip 150 is preferably a relatively small chamber which extends from the end of the scraping tip into between approximately 1% to approximately 10% of the length of the hook.

The scraping tip 150 is used to scrape substances that have adhered to the bottom surface within a vessel as well as any substance that has adhered to the curved interior surface of a vessel. In one embodiment, the scraping tip is made from either a plastic composite or a metal such as, but not limited to, stainless steel. In one embodiment, attached to the tip of the scraping hook is a collection reservoir 155 that is operable to collect substances that have been scraped off the interior surface of a vessel as the substances are scraped from the interior surface of the vessel.

Figure 3B:
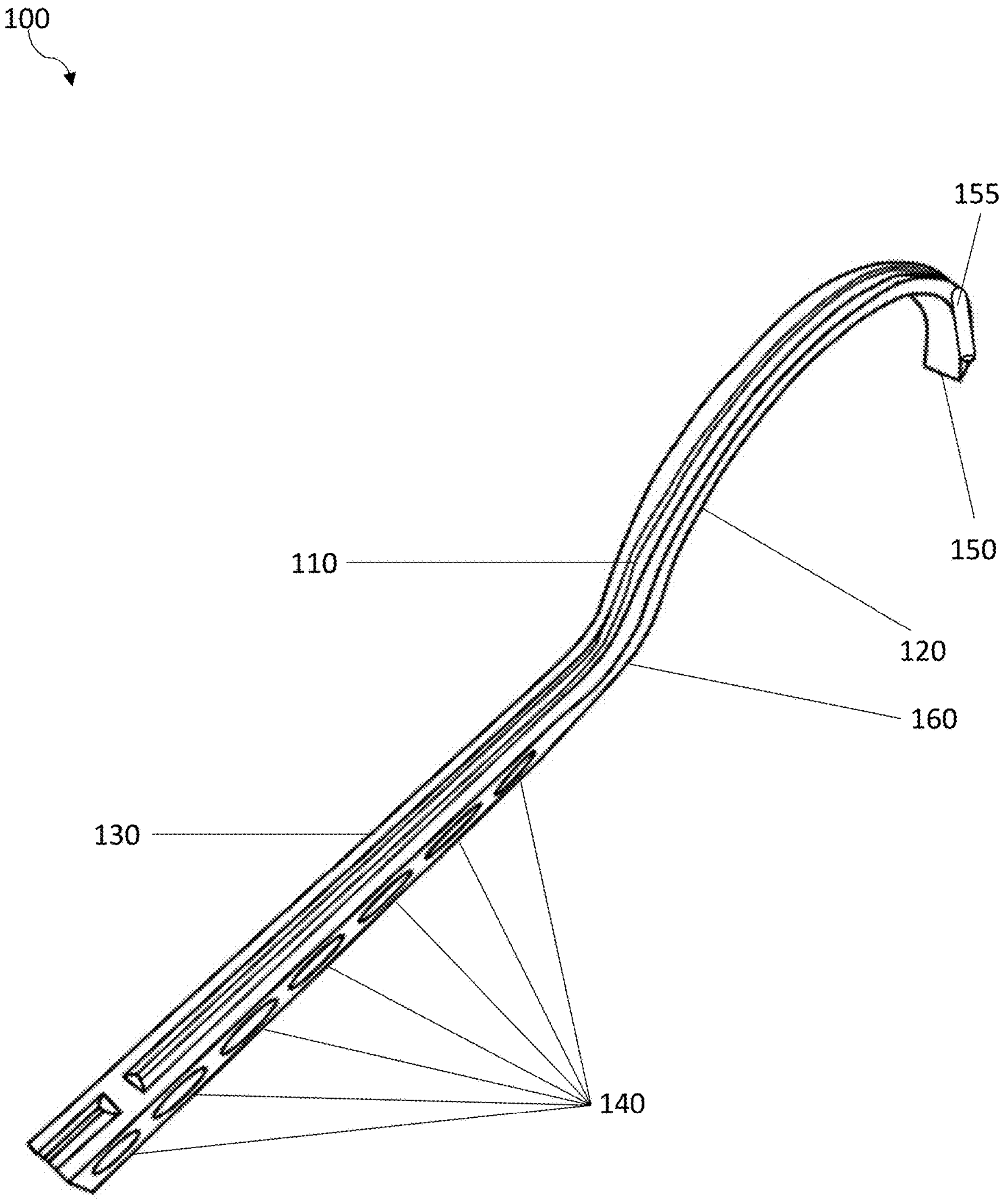
FIG. 3B illustrates a top perspective view of a scraping device including a collection reservoir according to one embodiment of the invention.

FIG. 3B illustrates a top perspective view of a scraping device including a collection reservoir 155 on one side of the scraping tip 150 according to one embodiment of the invention. The scraping device 100 includes a handle 130, finger grips 140, an elbow joint 160, a hook 120, a ribbed edge 110, scraping tip 150 and a collection reservoir 155. The collection reservoir 155 is positioned on the scraping tip 150 such that as substances are scraped from the interior surface of a vessel, the substances will subsequently then fall towards the scraping tip 150 where the collection reservoir 155 is located. In one embodiment, the collection reservoir 155 includes two collection reservoirs on the sides of the scraping device 100. The collection reservoirs are positioned slightly back from the end of the scraping tip 150 such that the scraping tip 150 has sufficient clearance to scrape the interior of a vessel and the scraped substances are collected in one of the collection reservoirs. Advantageously, by including collection reservoirs on both sides of the scraping device 100, the scraping device 100 is operable to be utilized by both right-hand and left-hand users since the angle of the scraping tip 150 and trajectory of the scraped content will depend on the angle with which the scraping device 100 is held and manipulated to scrape the content from the interior of the vessel. In one embodiment, the collection reservoirs are tube-shaped and include an opening at a first end of the collection reservoir closest to the scraping tip 150 to allow the substance scraped by the scraping tip 150 to enter the collection reservoirs. The other end of the collection reservoir 155 is closed such that the substance is retained in the collection reservoir 150. The shape of the collection reservoir 155 is operable to be shorter or longer than the collection reservoir 155 illustrated in FIG. 3B. For example, a longer collection reservoir is curved such that the shape of the collection reservoir follows the curve of the hook 120 along the side of the hook 120 so as to not interfere with operation of the scraping device 100 as the scraping device 100 contacts the interior surface of the vessel. The collection reservoir 155 is operable to be constructed out of the same material as the scraping device 100 and integrally formed with the scraping device 100 in one embodiment. Alternatively, the collection reservoir 155 is attached to the scraping device 100 via chemical means such as adhesive, or via physical means such as one or more fasteners or one or more snap-fit components. In yet another embodiment, the collection reservoirs include channels on the side of the hook 120 which begin at the end of the scraping tip 150 on the side of the scraping tip 150 and follow the contour of the hook 120 in the center of the side of the hook 120 until the channels terminate. The channels are operable to include a removable cover that retains the scraped substance in the channels as the substance is scraped from the interior of the vessel and passes into the channels. In one embodiment, the removable cover is an elastic sheath that fits over a portion of the scraping tip 150 and a portion of the hook 120, thereby providing for retention of the substance once the substance enters the channel from the scraping tip. Once the scraped substance is collected in the channels by scraping the interior of the vessel using the scraping tip 150, the removable cover is operable to be removed and the scraped substance is removed from the channels by any chemical or physical means, such as by scraping the channels to obtain the substance retrieved from the interior of the vessel.

FIGS. 5-6 illustrate how the scraping device 100 is operable to access the body of a laboratory vessel 230 through an opening 220 and neck 210 of a vessel. Because of the geometry of the subcomponents of the scraping device, the hook of the scraping device is operable to pass through the long neck of a laboratory vessel to reach the interior of the laboratory vessel. As illustrated in FIG. 5, the geometry and stiffness of the elbow joint 160 enables the hook to pass through the neck of the laboratory vessel. When the scraping device is entering a laboratory vessel, the handle 130 of the scraping device acts as a lever while the point of contact between the hook and the neck of the vessel acts as the fulcrum point to enable a user to apply enough force to slightly straighten the curvature of the hook without too much effort. Advantageously, this mechanical relationship requires little force from the user and decreases the risk of damaging the vessel.

Notably, the scraping device 100 of the present invention is operable to be utilized with a variety of different sized flasks. The scraping device 100 is constructed with different dimensions depending on the size flask for which the scraping device 100 is utilized. In one embodiment, the length of the handle 130 and length and size and/or curvature of the hook 120 varies based on the size of the vessel for which the scraping device 100 is manufactured. In one embodiment, the length of the handle 130 is adjustable. The handle is a telescoping handle in one embodiment which provides for lengthening or shortening the handle via a telescoping mechanism. The scraping device of the present invention is operable to be utilized with any round bottom flask, including round bottom flasks having sizes from 5 mL to 20 L. By way of example and not limitation, the scraping device 100 is operable to be utilized to scrape substances from the interior of 5 mL, 10 mL, 15 mL, 20 mL, 25 mL, 50 mL, 100 mL, 125 mL, 200 mL, 250 mL, 300 mL, 500 mL, 1 L, 2 L, 3 L, 5 L, 6 L, 10 L, 12 L, and 20 L round bottom flasks. However, one of ordinary skill in the art will appreciate that the scraping device of the present invention is operable to be utilized with any size round bottom flask.

Figure 7:
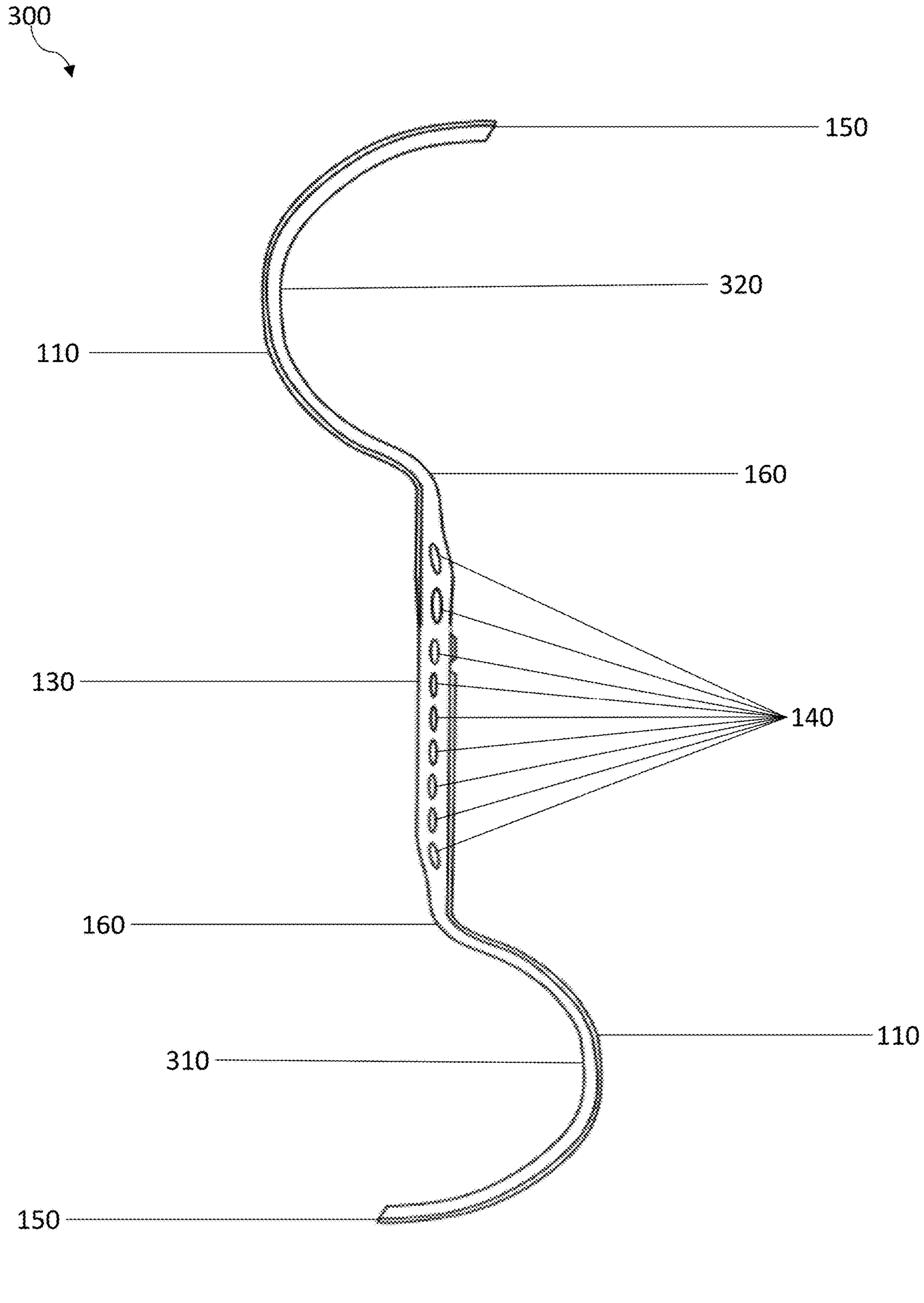
FIG. 7 illustrates a side orthogonal view of a scraping device according to one embodiment of the invention.

FIG. 7 illustrates an alternative embodiment of a scraping device 300 in which the scraping device 300 has two different hooks on opposite ends of the scraping device 300 such that each hook is designed for a different size laboratory vessel. As way of example, and not limitation, a first hook 310 is designed with a smaller curvature to scrape the inside of a 100 mL flask, while a second hook 320 on the opposite end of the scraping device 100 is designed with a larger curvature to scrape the inside of a 500 mL flask. Advantageously, the scraping device 300 including two different hooks on opposite ends enables the scraping device to be compatible with more than one size laboratory flask. Alternatively, the scraping device 300 includes the same size hook on the opposite ends of the scraping device 300. The scraping device 300 shares similar components as other embodiments of the scraping device. Such components include, but are not limited to, a handle 130, a ribbed edge 110, an elbow joint 160, a scraping tip 150, and finger grips 140.

Figure 8:
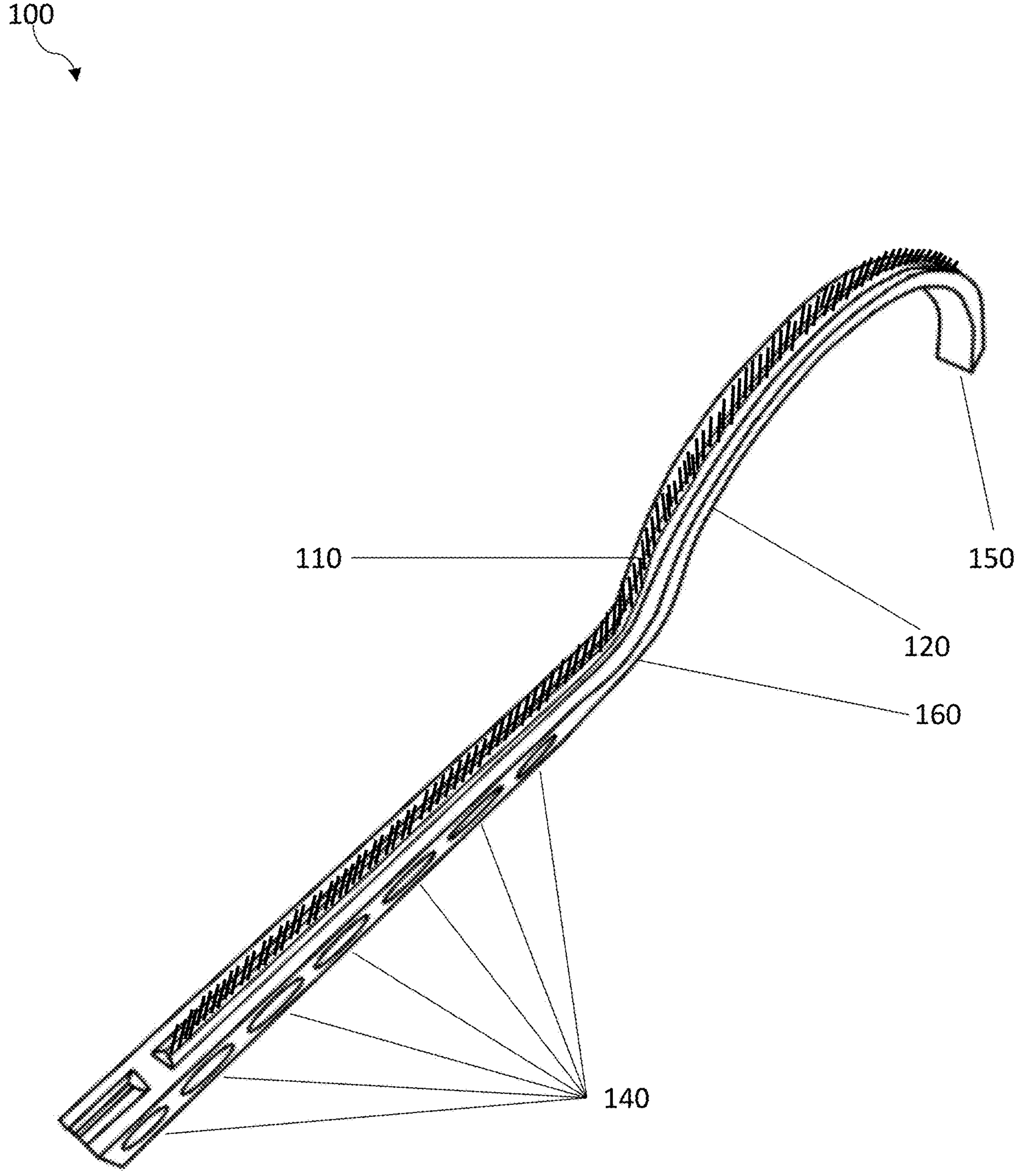
FIG. 8 illustrates a top perspective view of a scraping device according to one embodiment of the invention.

FIG. 8 illustrates a top perspective view of one embodiment of a scraping device of the present invention. The scraping device 100 includes a handle 130, a hook 120 and a ribbed edge 110. The ribbed edge 110 includes brush bristles and is formed along at least a portion of the outer surface of the hook 120. The brush bristles include, but are not limited to, stiff bristles, medium bristles, and soft bristles.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A scraping device for scraping and removing substances from an interior surface of a vessel, comprising:
- a handle;
- an elbow joint;
- a semi-circular hook;
- a ribbed edge;
- a scraping tip; and
- a substance collection reservoir;
- wherein the substance collection reservoir includes a physical chamber built into the scraping tip;
- wherein the substance collection reservoir extends from an end of the scraping tip into at least 1% of a length of the semi-circular hook;
- wherein the handle is connected to the semi-circular hook by the elbow joint;
- wherein the semi-circular hook is operable to conform to the interior surface of the vessel;
- wherein the ribbed edge is formed along an exterior surface of the semi-circular hook and provides a flush fit between the scraping device and the interior surface of the vessel;
- wherein the ribbed edge is formed along the outside perimeter of the semi-circular hook in its entirety and acts as a scrapping edge to scrape the interior of the vessel;
- wherein the semi-circular hook has a handle end and a distal end;
- wherein the scraping tip is located at the distal end of the semi-circular hook and extends away from the distal end of the semi-circular hook;
- wherein the vessel includes an opening and a neck; and
- wherein rotation of the scraping device causes the ribbed edge to scrape a substance adhered to the interior side surface of the vessel, thereby removing the substance from the interior side surface of the vessel.

2. The scraping device of claim 1, wherein the ribbed edge includes serrations to increase applied pressure at each point of contact between the serrations and the interior surface of the vessel.

3. The scraping device of claim 1, wherein the ribbed edge includes bristles for removing substances from the interior surface of the vessel.

4. The scraping device of claim 1, wherein the ribbed edge includes a blade for removing substances from the interior surface of the vessel.

5. A scraping device for scraping and removing substances off an interior surface of a laboratory vessel, comprising:
- a handle;
- an elbow joint;
- a semi-circular hook;
- a ribbed edge;
- a scraping tip; and
- a substance collection reservoir;
- wherein the substance collection reservoir includes a physical chamber built into the scraping tip;
- wherein the substance collection reservoir extends from an end of the scraping tip into at least 1% of a length of the semi-circular hook;
- wherein the handle is connected to the semi-circular hook by the elbow joint;
- wherein the semi-circular hook is operable to bend and conform to the interior surface of the laboratory vessel;
- wherein the ribbed edge provides a flush fit between the scraping device and the interior surface of the laboratory vessel;
- wherein the ribbed edge is operable to scrape substances that have adhered to the interior surface of the laboratory vessel;
- wherein the laboratory vessel includes an opening, a body and a neck;
- wherein a width of the body is wider than a width of the opening and/or neck;
- wherein the semi-circular hook has a handle end and a distal end; and wherein the scraping tip is connected to the distal end of the semi-circular hook and extends away from the distal end of the semi-circular hook.

6. The scraping device of claim 5, wherein the ribbed edge includes serrations to increase applied pressure at each point of contact between the serrations and the interior surface of the laboratory vessel.

7. The scraping device of claim 5, wherein the ribbed edge includes bristles for removing substances from the interior surface of the laboratory vessel.

8. The scraping device of claim 5, wherein the ribbed edge includes a blade for removing substances from the interior surface of the laboratory vessel.

9. The scraping device of claim 5, wherein the scraping device includes two hooks on opposite ends of the scraping device connected by the handle.

10. A scraping device for scraping and removing substances off an interior surface of a laboratory vessel, comprising:

a handle;
finger grips;
an elbow joint;
a semi-circular hook;
a ribbed edge; and
a scraping tip;

wherein the handle is connected to the semi-circular hook by the elbow joint;

wherein the finger grips are indents within the handle;

wherein the semi-circular hook is operable to bend and conform to the interior surface of the laboratory vessel;

wherein the ribbed edge provides a flush fit between the scraping device and the interior surface of the laboratory vessel;

wherein the ribbed edge is operable to scrape substances that have adhered to the interior surface of the laboratory vessel;

wherein the laboratory vessel includes an opening, a body and a neck;

wherein a width of the body is wider than a width of the opening and/or neck;

wherein the semi-circular hook has a handle end and a distal end; and wherein the scraping tip is connected to the distal end of the semi-circular hook and extends away from the distal end of the semi-circular hook.

11. The scraping device of claim 10, wherein the ribbed edge includes serrations to increase applied pressure at each point of contact between the serrations and the interior surface of the laboratory vessel.

12. The scraping device of claim 10, wherein the ribbed edge includes bristles for removing substances from the interior surface of the laboratory vessel.

13. The scraping device of claim 10, wherein the ribbed edge includes a blade for removing substances from the interior surface of the laboratory vessel.

14. The scraping device of claim 10, wherein the handle has a left and right side, wherein the finger grips are located on both the left and right side of the handle.

* * * * *